United States Patent
Su et al.

(10) Patent No.: US 11,249,650 B1
(45) Date of Patent: Feb. 15, 2022

(54) DATA PREFETCH METHOD IN DYNAMICALLY ADJUSTABLE AMOUNT

(71) Applicant: QNAP SYSTEMS, INC., New Taipei (TW)

(72) Inventors: Jing-Wei Su, New Taipei (TW); Chin-Tsung Cheng, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 0 days.

(21) Appl. No.: 17/152,826

(22) Filed: Jan. 20, 2021

(30) Foreign Application Priority Data

Sep. 30, 2020 (TW) .................................. 109133991

(51) Int. Cl.
*G06F 12/00* (2006.01)
*G06F 3/06* (2006.01)

(52) U.S. Cl.
CPC .......... *G06F 3/0611* (2013.01); *G06F 3/0604* (2013.01); *G06F 3/064* (2013.01); *G06F 3/067* (2013.01); *G06F 3/0659* (2013.01)

(58) Field of Classification Search
CPC ...... G06F 3/0611; G06F 3/0604; G06F 3/064; G06F 3/0659; G06F 3/067

USPC ......................................................... 711/154
See application file for complete search history.

(56) References Cited

U.S. PATENT DOCUMENTS

| | | | | |
|---|---|---|---|---|
| 5,896,548 | A * | 4/1999 | Ofek | G06F 12/0638 |
| | | | | 710/20 |
| 2003/0149842 | A1 * | 8/2003 | Kim | G06F 12/0897 |
| | | | | 711/128 |
| 2015/0032967 | A1 * | 1/2015 | Udayashankar | G06F 12/0862 |
| | | | | 711/137 |
| 2020/0327061 | A1 * | 10/2020 | Tan | G06F 12/0862 |

* cited by examiner

*Primary Examiner* — Mardochee Chery
(74) *Attorney, Agent, or Firm* — WPAT, PC

(57) ABSTRACT

A method of prefetching data in a dynamically adjustable amount is executed by: determining a specified number of data blocks according to an averaged data transmission rate and a predetermined fetching index; sending out a data request command to obtain a requested data, wherein the requested data is included in a specified data and consists of the same number of data blocks as the specified number; and receiving and storing the requested data as a prefetch data consisting of the same number of data blocks for prefetch as the specified number. when the specified number is equal to or greater than two, one of the data blocks for prefetch is designated as a launch block for prefetch, and when the launch block for prefetch is read, the fetching index is optionally adjusted according to a predetermined rule.

9 Claims, 6 Drawing Sheets

501

DATA PREFETCH METHOD IN DYNAMICALLY ADJUSTABLE AMOUNT

FIELD OF THE INVENTION

The present invention relates to a method of prefetching data, and more particularly to a method of prefetching data in a dynamically adjustable amount.

BACKGROUND OF THE INVENTION

Data prefetch is a technology for obtaining specific data that is expected to be used later. Since a data prefetching operation can be performed at the same time when another operation is performed, additional time spent for waiting for data transmission can be saved. Therefore, data prefetch technologies are common and popular in the data processing field.

However, when prefetching data files from Cloud by way of current data prefetch technologies, the amount of data obtainable in each prefetch operation can only be fixed or follow a fixed rule, e.g. obtaining all data of the same file at one time. Such rigid restrictions might cause a variety of problems. For example, fixed fetch data amount might require several data fetch operations to obtain data of an entire file, and thus the server would be frequently interrupted. On the other hand, in the case of relative narrow bandwidth, network congestion might be caused due to the fixed rule to transmit all data of an entire file simultaneously.

SUMMARY OF THE INVENTION

Therefore, the present invention provides an adaptive data prefetch method, which dynamically adjusts data amount in each prefetch operation based on previous data transmission status. For example, data amount requested in each prefetch operation can be determined according to an averaged data transmission rate within a preset period of time in the past and a reading behavior of a user so as to minimize prefetch operations and avoid network congestion.

In an aspect of the present invention, a method of prefetching data in a dynamically adjustable amount is executed by: determining a specified number of data blocks according to an averaged data transmission rate and a predetermined fetching index; sending out a data request command to obtain a requested data, wherein the requested data contains partial or all of specified contents and consists of the same number of data blocks as the specified number in response to the data request command; and receiving and storing the requested data as a prefetch data consisting of the same number of data blocks for prefetch as the specified number. When the specified number is equal to or greater than two, one of the data blocks for prefetch is designated as a launch block for prefetch, and when the launch block for prefetch is read, the fetching index is optionally adjusted according to a predetermined rule.

In another aspect of the present invention, a terminal device in communication with a server via a network comprises a processor, at least one storage device and at least one transmission interface. The processor executes a specified application program and a file management system, and determines a specified number of data blocks according to an averaged data transmission rate and a predetermined fetching index. The at least one storage device stores data required by the application program. The at least one transmission interface is in communication with the server via the network. A data request command is sent to the server via the at least one transmission interface to obtain a requested data, wherein the requested data is included in a specified data and consists of the same number of data blocks as the specified number, and the requested data is received from the sever via the at least one transmission interface and stored in the at least one storage device as a prefetch data consisting of the same number of data blocks for prefetch as the specified number. When the specified number is equal to or greater than two, one of the data blocks for prefetch is designated as a launch block for prefetch, and when the launch block for prefetch is read, the fetching index is optionally adjusted according to a predetermined rule.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
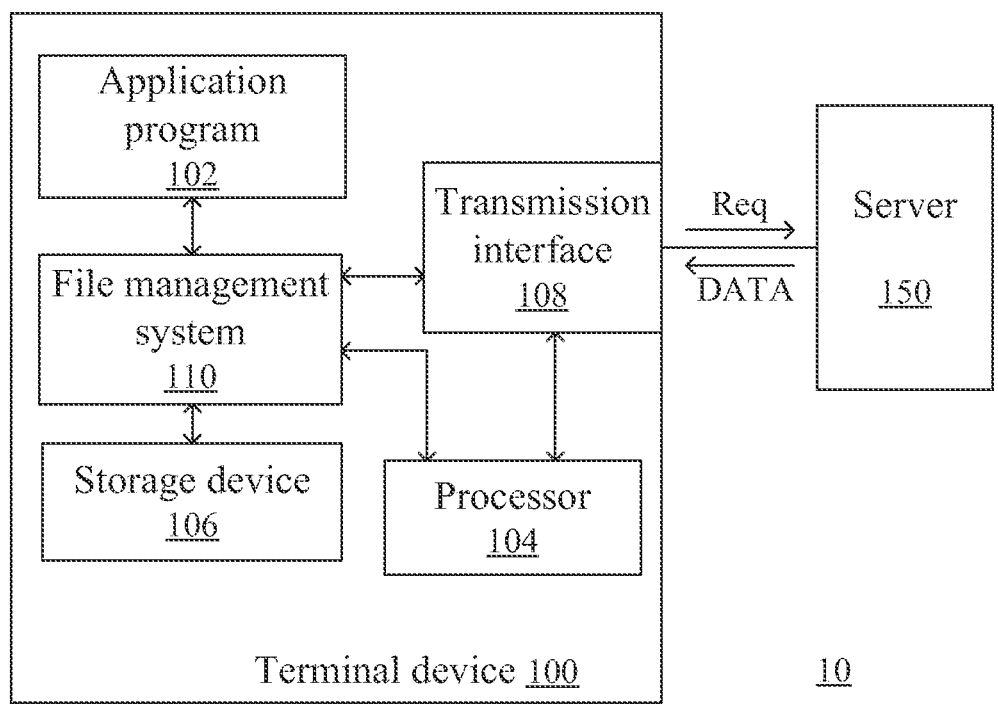
FIG. 1 is a schematic architecture of a system for prefetching data in a dynamically adjustable amount according to an embodiment of the present invention.

Please refer to FIG. 1. A data prefetch system 10 according to an embodiment of the present invention includes a terminal device 100 and a server 150, e.g. a Cloud server, and data can be obtained from the server 150 in response to a request sent to the server 150 via the terminal device 100. The terminal device 100 includes a processor 104, which executes at least one application program 102 and a file management system 110, wherein data required for executing the application program 102 can be obtained with cooperation of the file management system 110. When requiring specified contents, the application program 102 notifies the file management system 110 for requesting the specified contents. The file management system 110 first determines whether the specified contents are existent in a storage device 106 of the terminal device 100. The storage device 106 may be single unit or include more than one unit working cooperatively. If the required contents are existent in the storage device 106, the file management system 110 sends a request command Req out to access the specified contents from the storage device 106 directly and provides the specified contents for the application program 102 while the application program 102 is starting to read the specified contents. On the contrary, if the specified contents do not exist in the storage device 106, the file management system 110 sends one or more request commands Req to an external device, e.g. the server 150, via a transmission interface 108 and a network, e.g. Intranet or Internet linking thereto, to prefetch the specified contents at one time or in batches, and stores the prefetch data to the storage device 106 after receiving the prefetch data from the server 150 via the transmission interface 108 and the network. The terminal device 100 may include more than one transmission interface 108 for communication depending on practical requirements.

In this embodiment, data amount to be prefetched in response to each single request command Req can be determined according to a transmission parameter indicative of a transmission status of a transmission channel between the terminal device 100 and the network. Furthermore, the data amount to be prefetched in response to a request commands Req can be dynamically adjusted with a fetching index. The fetching index "1" indicates a standard unit of amount, and under certain conditions, the fetching index is set to a multiple or a ratio instead of "1". Hereinafter, a method for prefetching data in a dynamically adjustable amount according to an embodiment of the present invention will be described in more detail with reference to flowcharts of FIG. 2.

Figure 2:
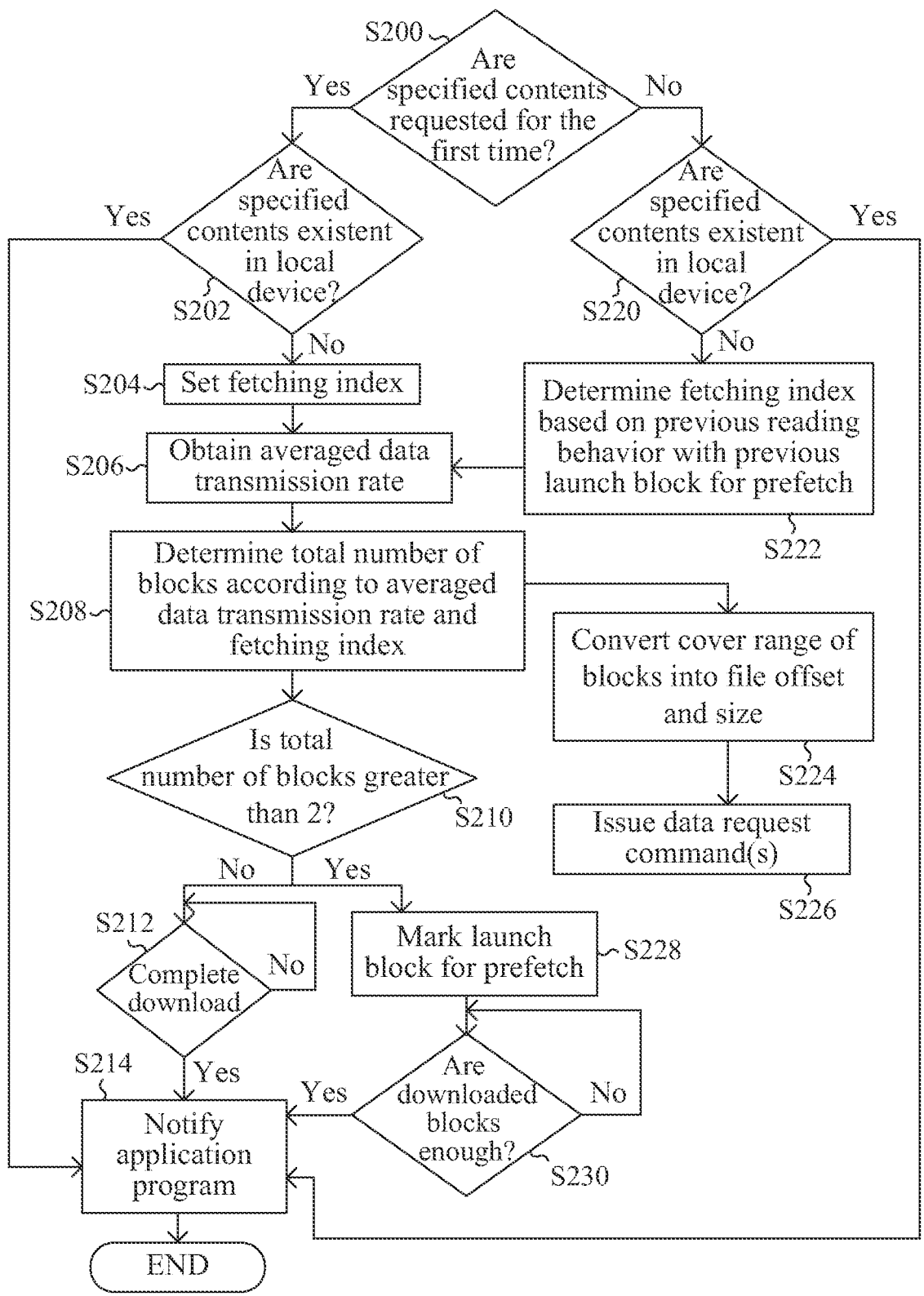
FIG. 2 is a flowchart schematically illustrating a method for prefetching data in a dynamically adjustable amount according to an embodiment of the present invention.

FIG. 2 schematically illustrates a data prefetch method according to an embodiment of the present invention. The file management system 110 first determines whether the specified contents to be read is requested for the first time or not (Step S200). If positive, the file management system 110 further determines whether the specified contents have been stored in the storage device 106 or not (Step S202). If the specified contents have been stored in the storage device 106, the file management system 110 informs the application program 102 of the available status of the specified contents (Step S214). On the contrary, if the specified contents are not existent in the storage device 106, the file management system 110 sets a fetching index for prefetching the specified contents (Step S204) and obtains a transmission parameter, e.g. an averaged data transmission rate through a transmission channel, at a specified time point (Step S206). In this embodiment, the transmission channel is the one linking the server 150 and the transmission interface 108.

Figure 3:
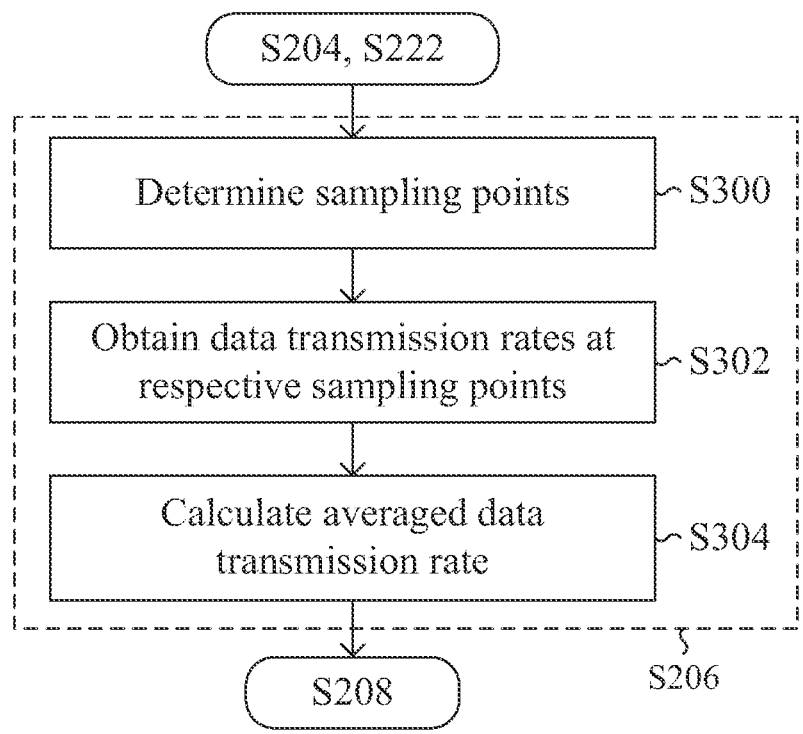
FIG. 3 is a flowchart exemplifying the implementation details of S206 shown in the flowchart of FIG. 2.

The operation to obtain the averaged data transmission rate mentioned in Step S206 can be executed in a manner as illustrated in the flowchart of FIG. 3. The file management system 110 first determines a plurality of sampling points relative to the specified time point for calculating the averaged data transmission rate according to a specific rule (Step S300). For example, the specified time point is defined as the current time, and the sampling points are within a period of time, e.g. 10 seconds, immediately before the specified time point. Then the file management system 110 obtains data transmission rates at the sampling points, respectively (Step S302). For example, the data transmission rates are existent data recorded by an operating system or a network device, or they are parts of history data recorded in a file system, or can be retrieved from a network interface card (NIC). Subsequently, the file management system 110 averages the data transmission rates to obtain the averaged data transmission at the specific time point (Step S304).

In the above embodiment, the rule for determining the specified time point and the sampling points mentioned in Step S300 are concerned with a time period immediately from the current time. It is advantageous in reflecting the status of the transmission channel in real time. Alternatively, the rule may involve a longer time period in the past, such as last few days or last few weeks, or an upcoming time period before the specified time point. Then it is advantageous in reflecting the routine status of the transmission channel. The rule can be designed or modified according to practical requirements.

In an alternative embodiment, instead of the averaged data transmission rate, which is obtained by directly averaging the data transmission rates relative to the specified time point and corresponding to the sampling points, determination of data amount in a single data prefetch operation may be based on an averaged available bandwidth. The file management system 110 extracts each of the data transmission rates respectively corresponding to the sampling points from a default bandwidth of the transmission channel to obtain corresponding available bandwidths. Then the available bandwidths are averaged to obtain the averaged available bandwidth. Of course, any other suitable parameters that can practically indicate a status of the transmission channel for properly estimating data amount to be prefetched in a batch can be used to replace for the averaged data transmission rate and the averaged available bandwidth.

It is to be noted that in the embodiment illustrated with reference to FIG. 3, the operations for obtaining the averaged data transmission rate mentioned in Step S206 (or the averaged available bandwidth) are executed by the file management system 110. Alternatively, some or all of the operations may be performed by the processor 104 with a specific program.

Refer back to FIG. 2. Following Step S206, the file management system 110 determines a number of data blocks to be requested with this request command according to a size of the requested data, the averaged data transmission rate and the fetching index (Step S208) before sending out a data request command Req. For example, whenever the first ones of this and subsequent request commands for requesting the specified contents is issued and sent to the server 150, the fetching index is initially set to be "1". That is, a standard amount of data is to be requested in response to the first request command. Subsequently, the fetching index could be remained "1" or dynamically adjusted to a proper multiple or ratio depending on one or more critical conditions, thereby adaptively adjusting the amount of the requested data. The critical conditions may be preset in the design of the system 10, and will be exemplified later.

Figure 4:
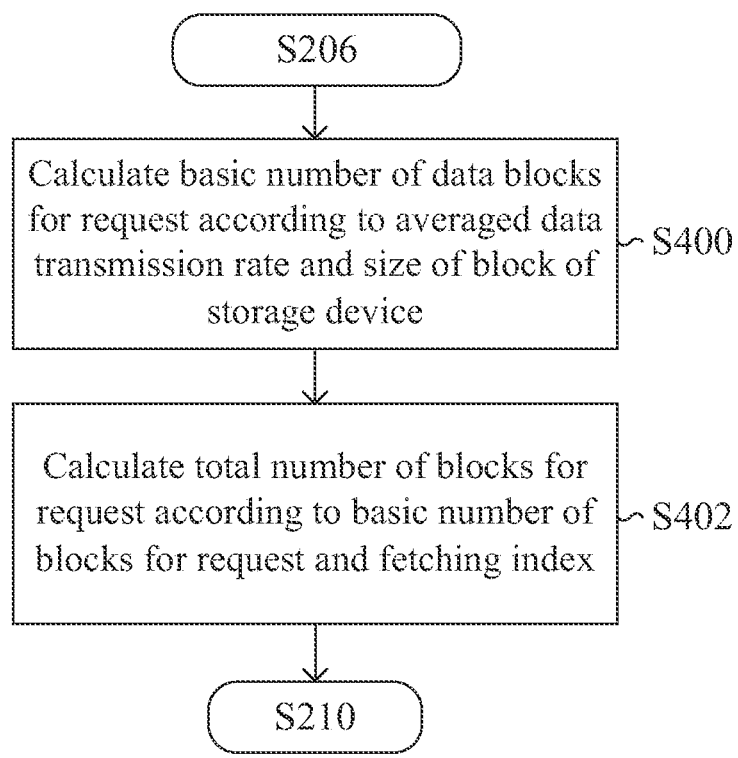
FIG. 4 is a flowchart exemplifying the implementation details of Steps S208 shown in the flowchart of FIG. 2.

The flowchart of FIG. 4 illustrates Step S208 in more detail. The file management system 110 divides the averaged data transmission rate by a size of each block of the storage device 106 (Step S400). The resulting quotient value is supposed to indicate a number of blocks. Therefore, if the quotient value is a non-integer, it should be adjusted, e.g. carried, into an integer. The obtained integer is defined as a basic number of data blocks for request. If any other algorithm is adopted instead of carrying, it is to be noted that the basic number of data blocks should be one or more so that at least one block could be requested in response to the request command. Furthermore, it is understood that the basic number of data blocks for request, i.e. substantially the quotient, would vary with the averaged data transmission rate, i.e. the dividend.

According to the basic number of data blocks for request, the file management system 110 calculates a total number of data blocks corresponding to the present request command (Step S402). Furthermore, the basic number of data blocks for request can be optionally adjusted with the fetching index. For example, an adjusted basic number of data blocks for request can be obtained by multiplying the previously calculated basic number of data block by the fetching index. Of course, any other suitable operation instead of simple multiplication can be used as long as the result can practically reflect the basic number of data blocks for request.

Following Step S208, the file management system 110 converts the total number of data blocks into a relevant parameter (Step S224). The relevant parameter, for example, includes a file offset and a data amount of the prefetch data corresponding to the present request command. The file management system 110 then sends a request command Req to the server 150 via the transmission interface 108 (Step S226). Subsequently, the file management system 110 takes different actions depending on the total number of data blocks. If it is determined in Step S210 that the total number of data blocks is less than 2, i.e. 1, the file management system 110 stores the requested data DATA into a block of the storage device 106 (hereinafter "data block for prefetch") as prefetch data. Once it is determined that downloading of the requested data DATA has been completed in Step S212 so that the prefetch data is ready, the file management system 110 notifies the application program 102 to start reading the prefetch data from the data region for prefetch (Step S214). On the other hand, if the total number of data blocks is greater than or equal to 2, the file management system 110 further sets one of the data blocks for prefetch to be a launch block for prefetch (Step S228). For example, the file management system 110 uses a launching tag for continuous reading to point to one of the data blocks for prefetch. Once it is determined that enough data blocks have been downloaded in Step S230, the application program 102 is notified to read the prefetch data (Step S214). Concretely, assuming a number of the data blocks for prefetch in response to a certain command request Req is "N", and it is not determined enough until M data blocks are downloaded, where M≤N and M≥1. In other words, the application program 102 will not be notified until M data blocks are downloaded. The setting of the value M varies with practical requirements and can be dynamically adjusted.

Hereinbefore, the data prefetch procedures executed when the specified contents to be read is requested for the first time. On the contrary, if it is determined that the specified contents to be read is not requested for the first time in Step S200, the file management system 110 sets a value of the fetching index according to previous reading behavior in connection with the same specified contents (Step S222) and then executes Step S206 and the subsequent procedures to obtain corresponding data.

Figure 5A:
FIGS. 5A-5D are schematic diagrams integrally illustrating prefetched blocks in response to a series of request commands.

In Step S208 of FIG. 2, which is illustrated in more detail in FIG. 4, if the averaged data transmission rate is obtained to be 0.5 block per second, it can be carried into 1 block/sec. Accordingly, the basic number of data blocks for request is "1". Since the fetching index is initially set to be "1", the total number of data blocks for request is equal to 1*1=1. In other words, the amount of the specified contents (hereinafter, "first specified contents") corresponding to the present request command (hereinafter, "first request command") will be equal to a capacity of one data block for prefetch. In response to the first request command, a first requested data is downloaded and stored into a data block 501 for prefetch in the storage device 106, as shown in FIG. 5A. After a first prefetch data is successfully stored in the storage device 106, it is available to be accessed by the application program 102. It is to be noted that the file management system 110 will not store that data block as a launch block for prefetch because there currently exists only one data block for prefetch.

After the first request command is sent out in Step S226, the file management system 110 starts to prepare for next data request command (hereinafter, "second request command"). If the second request command is for requesting a second requested data that is not continuous to the first requested data, the file management system 110 classifies the second request command into a random reading type of command, and sets the fetching index to be initially "1". On the other hand, under a critical condition that the second requested data corresponding to the second request command is continuous to the first requested data, the fetching index may be equal to the previously "1" or optionally adjusted into a value greater than "1".

Figure 5B:
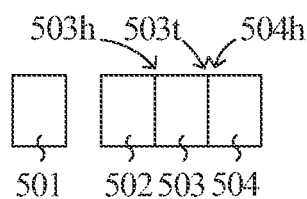

Refer to FIG. 5B, which schematically illustrate an example where the second request command is of a random reading type, and the averaged data transmission rate corresponding to the second request command is 2.7 data blocks per second. Under this circumstance, the basic number of data blocks for request is "3", and the fetching index is "1". Therefore, the total number of data blocks for request is equal to 3*1=3. In other words, the amount of the second requested data in response to the second request command will be equal to a capacity of three data blocks for prefetch, and the three blocks will be sequentially stored into data blocks 502-504 in the storage device 106. After a preset amount or all of the second requested data is stored as the second prefetch data, the second prefetch data is open for reading by the application program 102. In this case, the threshold M mentioned above can be 1, 2, or 3, depending on practical requirements.

Figure 6:
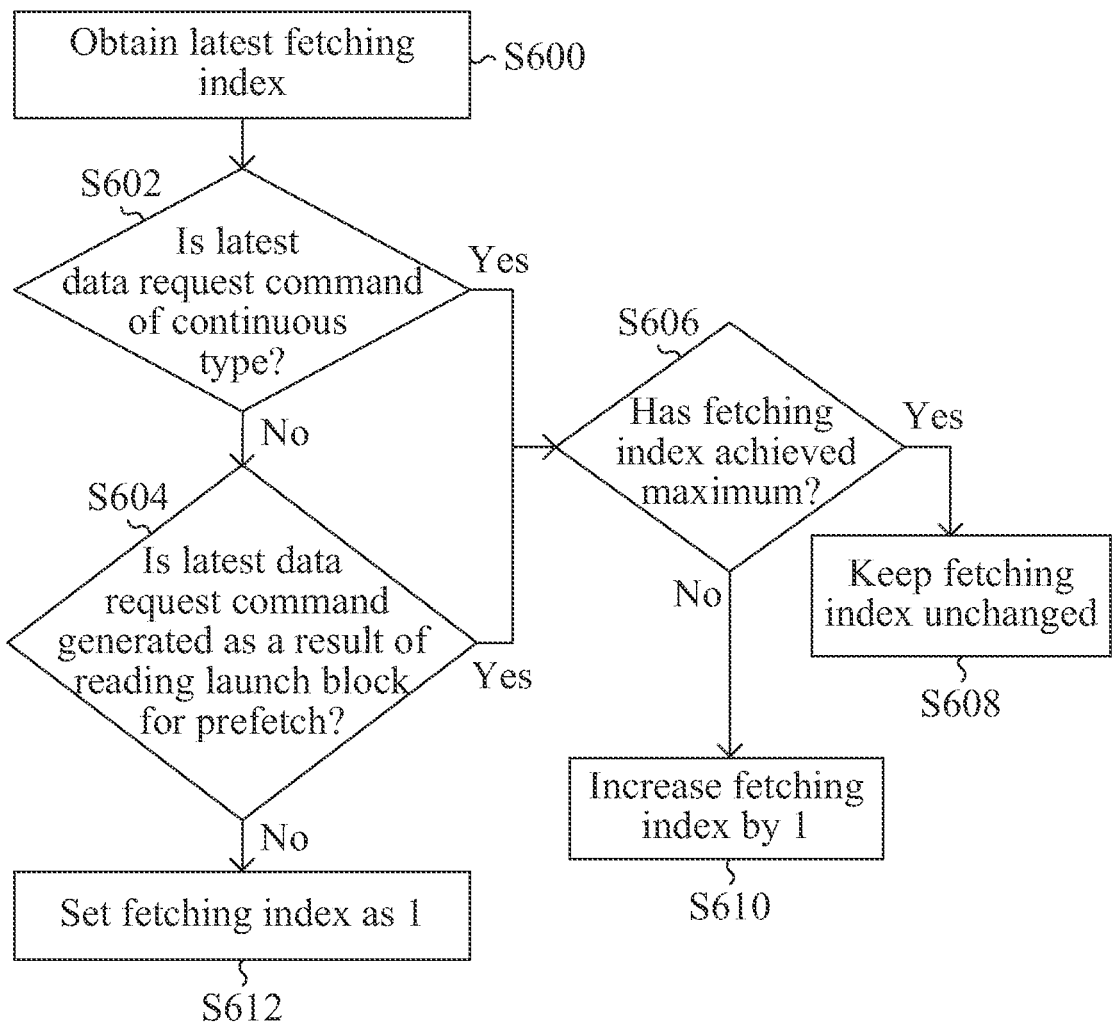
FIG. 6 is a flowchart exemplifying the implementation details of Steps S222 shown in the flowchart of FIG. 2.

As described above, three blocks 502-504 of the storage device 106 are used for storing the second prefetch data. One of the three blocks 502-504 will be set to be a launch block for prefetch by the file management system 110. Assume the data block 503 is set as the launch block for prefetch. When the application program 102 reads the launch block 503, the file management system 110, which monitors data reading operations, sets the fetching index, and optionally adjusts the fetching index according to critical conditions, e.g. continuity of requested data. An example for setting the fetching index, i.e. Step S222 of FIG. 2, is given as follows with reference to FIG. 6. At first, the latest fetching index is obtained (Step S600). Then whether the latest data request command is of a continuous type (Step S602) and whether the latest data request command generated as a result of reading the launch block 503 (Step S604) are determined. If both the discriminating results of Step S602 and Step S604 are positive, the file management system 110 executes Step S666 to determine whether the latest fetching index has been a preset maximum (hereinafter, "maximal fetching index"). If the latest fetching index has been the maximal fetching index, the file management system 110 keeps the fetching index unchanged (Step S608). On the contrary, if the latest fetching index has not yet reached the maximum, the file management system 110 updates the fetching index by increasing the value of the latest fetching index by 1 (Step S610). Furthermore, if both the discriminating results of Step S602 and Step S604 are negative, the file management system 110 sets the latest fetching index to be "1" (Step S612).

Figure 5C:
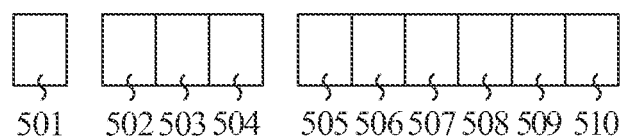

Refer back to FIG. 5B again and assume the maximal fetching index is "2". When the application program 102 reads data from the launch block 503, the file management system 110 starts to prepare for sending out a new request command accordingly, and the fetching index is increased from "1" to "2" according to the algorithm illustrated in FIG. 6. As long as the specified contents have not been completely downloaded from the server 150, a subsequent third request command will be sent by the file management system 110. While sending out the third data request command, the file management system 110 refers to the latest averaged data transmission rate and the latest fetching index, which is currently "2" to determine amount of a third requested data. Assuming that the averaged data transmission rate descends to less than or equal to 1 data block per second, the corresponding basic number of data blocks for request is then decreased to 1. Therefore, the total number of data blocks for request is equal to 1*2=2. In other words, the amount of the third requested data in response to the third request command will become equal to a capacity of two data blocks for prefetch. Under an alternative assumption that the averaged data transmission rate ascends to 4 data blocks per second, the corresponding basic number of data blocks for request is then increased to 4. Therefore, the total number of data blocks for request is equal to 4*2=8. In other words, the amount of the third requested data in response to the third request command will become equal to a capacity of eight data blocks for prefetch. In this example, the averaged data transmission rate is assumed to remain at 2.7 data blocks per second, so the corresponding basic number of data blocks for request is 3. Therefore, the total number of data blocks for request is equal to 3*2=6. In other words, the amount of the third requested data in response to the third request command is equal to a capacity of six data blocks for prefetch. FIG. 5C schematically illustrates the six data blocks 505-510 for storing the third fetch data corresponding to the third requested data.

Figure 5D:
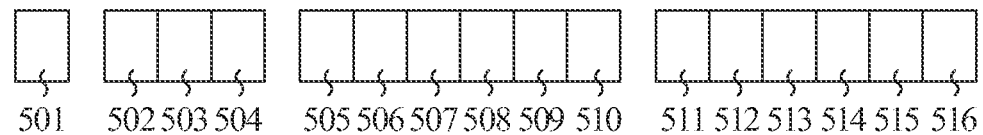

In this example, the number of data blocks for the third requested data is greater than 2. Therefore, one of the data blocks 505-510 is set to be the launch block for prefetch. If next request command, i.e. a fourth request command, is continuous to the third request command, and the latest fetching index "2" has been the maximal one, the fetching index for a fourth requested data corresponding to the fourth request command is unchanged, i.e. remains "2". Therefore, the amount of the fourth requested data in response to the fourth request command remains equal to a capacity of six data blocks 511-516 for prefetch, as shown in FIG. 5D. On the other hand, if a fifth request command discontinuous to the third request command is sent out after the third request command and before the fourth request command, the fetching index for a fifth requested data corresponding to the fifth request command will be reset to be "1" according to the algorithm illustrated in FIG. 6. Afterwards, the fetching index for the fourth requested data corresponding to the fourth request command will be adjusted into "2" through Steps S604, S606 and S610.

It is understood from the above that after a series of prefetching operations are performed or when the launch block is accessed, the fetching index is accumulatively increased unless the maximum is achieved. Therefore, even if the data transmission rate is kept constant, the prefetched data amount can be gradually increased. In other words, a total number of request commands issued and sent out for requesting the entire specified contents can be reduced compared with the prior art. In addition, the processing time for communication between the terminal device 100 and the server 150 can also be reduced, and the transmission bandwidth can be effectively utilized.

It is to be noted that in the above embodiments, a centrally located data block is selected as the launch block for prefetch for illustration only, and any one of the data blocks 502-504 corresponding to the second request command may be used as the launch block for prefetch. Preferably, one of the data blocks except the first block 502 is selected as the launch block. Likewise, any one of the data blocks 505-510 corresponding to the third request command may be used as the launch block for prefetch. Preferably, one of the data blocks except the first block 505 is selected as the launch block. Furthermore, as shown in Step S228, any point of the selected launch block can be preset to be a triggering point for prefetch or a triggering point for setting fetching index by marking the launch block for prefetch. For example, the triggering point may be a start point 503*h* or an end point 503*t* of the block 503, a start point 504*h* of the block 504 or any other suitable point.

Furthermore, for each request command, an additional adaptation rule more than setting of a launch block and/or a triggering point may be involved for prefetch or for setting of fetching index. For example, in the example illustrated in FIG. 5B, a prefetch accelerating tag can be enabled after all the data in the blocks 502-504 have been completely downloaded. Afterwards, when the application program 102 finishes reading the data in the block 502, the file management system 110 checks whether the prefetch accelerating tag is enabled. If the prefetch accelerating tag is enabled, it is determined that the transmission rate of the network is normal and available for next prefetching operation. In contrast, if the prefetch accelerating tag is not enabled, it is determined that the transmission rate of the network is not high enough. In order not to add burden to the network, the file management system 110 would suspend next operation. In another embodiment, the fetching index can be adjusted or reset based on the embodiment illustrated in FIG. 6 or any other suitable algorithm once the prefetch accelerating tag is enabled before the request command is issued and set out.

Based on the above, the method of prefetching data in a dynamically adjustable amount according to the present invention can adjust the data prefetch amount in each single data prefetch operation according to recent averaged data transmission rates and reading behavior, e.g. continuous or independent reading of data blocks. Accordingly, network congestion can be ameliorated upon narrow network bandwidth. Furthermore, when the data transmission rate is relatively high or when multiple requests are sent out for the same specified data, the amount of data required for each data prefetch operation can be gradually increased to reduce the overall number of prefetch requests so as to minimize the interruption of the server. Furthermore, the processing time for communication between the terminal device 100 and the server 150 can also be reduced, and the transmission bandwidth can be effectively utilized.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method of prefetching data in a dynamically adjustable amount, comprising steps of:
   a) determining a specified number of data blocks according to an averaged data transmission rate and a predetermined fetching index;
   b) sending out a data request command in order to obtain a requested data, wherein the requested data is included in a specified data and consists of the same number of data blocks as the specified number; and c) receiving and storing the requested data as a prefetch data consisting of the same number of data blocks for prefetch as the specified number in response to the data request command, wherein when the specified number is equal to or greater than two, one of the data blocks for prefetch is designated as a launch block for prefetch, and when the launch block for prefetch is read, the fetching index is optionally adjusted according to a predetermined rule.

2. The method according to claim 1, wherein the specified number is determined by:

selecting a plurality of sampling points within a preset period of time, and obtaining data transmission rates corresponding to the plurality of sampling points, respectively;

averaging the data transmission rates to obtain an averaged data transmission rate;

determining a basic number of data blocks for request according to the averaged data transmission rate, wherein the basic number is equal to or greater than one, and increased with promotion of the averaged data transmission rate; and obtaining the specified number by multiplying the basic number by the fetching index.

3. The method according to claim 1, wherein according to the predetermined rule, the fetching index is adjusted by adding one thereto.

4. The method according to claim 1, further comprising a step of executing steps d), e) and f), which repeat the steps a), b) and c), respectively, when the requested data is one part of the specified data, and there is still another part of the specified data to be requested.

5. The method according to claim 1, further comprising steps of:

enabling a prefetch accelerating tag after the last one of the data blocks of the prefetch data is completely stored;

checking whether the prefetch accelerating tag is enabled or not when the penultimate one of the data blocks of the stored prefetch data is completely read; and executing steps d), e) and f), which repeat the steps a), b) and c), respectively, when the prefetch accelerating tag has been enabled and there is still another part of the specified data to be requested.

6. The method according to claim 1, wherein the one of the data blocks for prefetch to be designated as the launch block for prefetch is one of the data blocks except for the first one.

7. The method according to claim 1, further comprising a step of prohibiting the stored prefetch data to be read until the former M blocks of the data blocks for prefetch are completely stored.

8. A terminal device in communication with a server via a network, comprising:

a processor executing a specified application program and a file management system, and determining a specified number of data blocks according to an averaged data transmission rate and a predetermined fetching index;

at least one storage device storing therein data required by the application program; and at least one transmission interface in communication with the server via the network, wherein a data request command is sent to the server via the at least one transmission interface to obtain a requested data, wherein the requested data is included in a specified data and consists of the same number of data blocks as the specified number, and the requested data is received from the sever via the at least one transmission interface and stored in the at least one storage device as a prefetch data consisting of the same number of data blocks for prefetch as the specified number, and wherein when the specified number is equal to or greater than two, one of the data blocks for prefetch is designated as a launch block for prefetch, and when the launch block for prefetch is read, the fetching index is optionally adjusted according to a predetermined rule.

9. The terminal device according to claim 8, wherein according to the predetermined rule, the fetching index is adjusted by adding one thereto.

* * * * *